Figure 5:
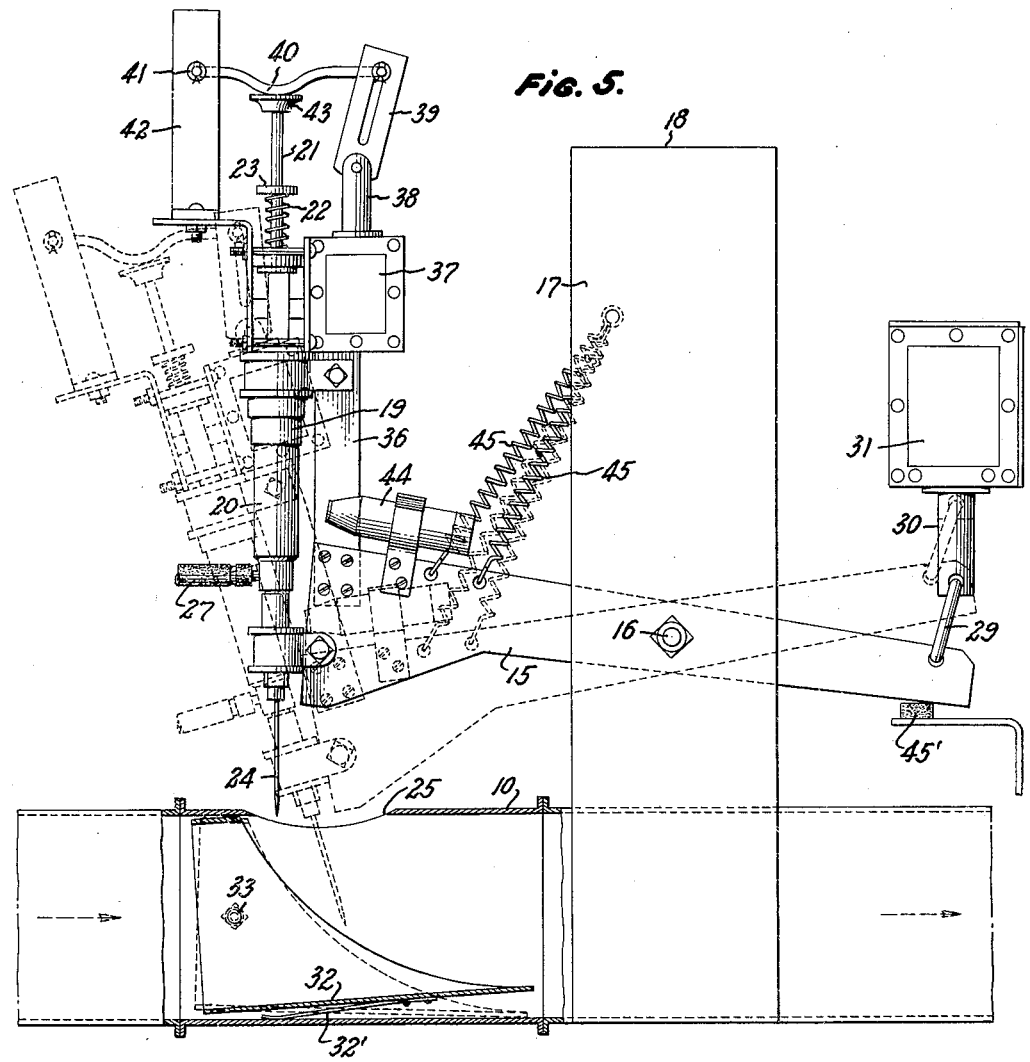

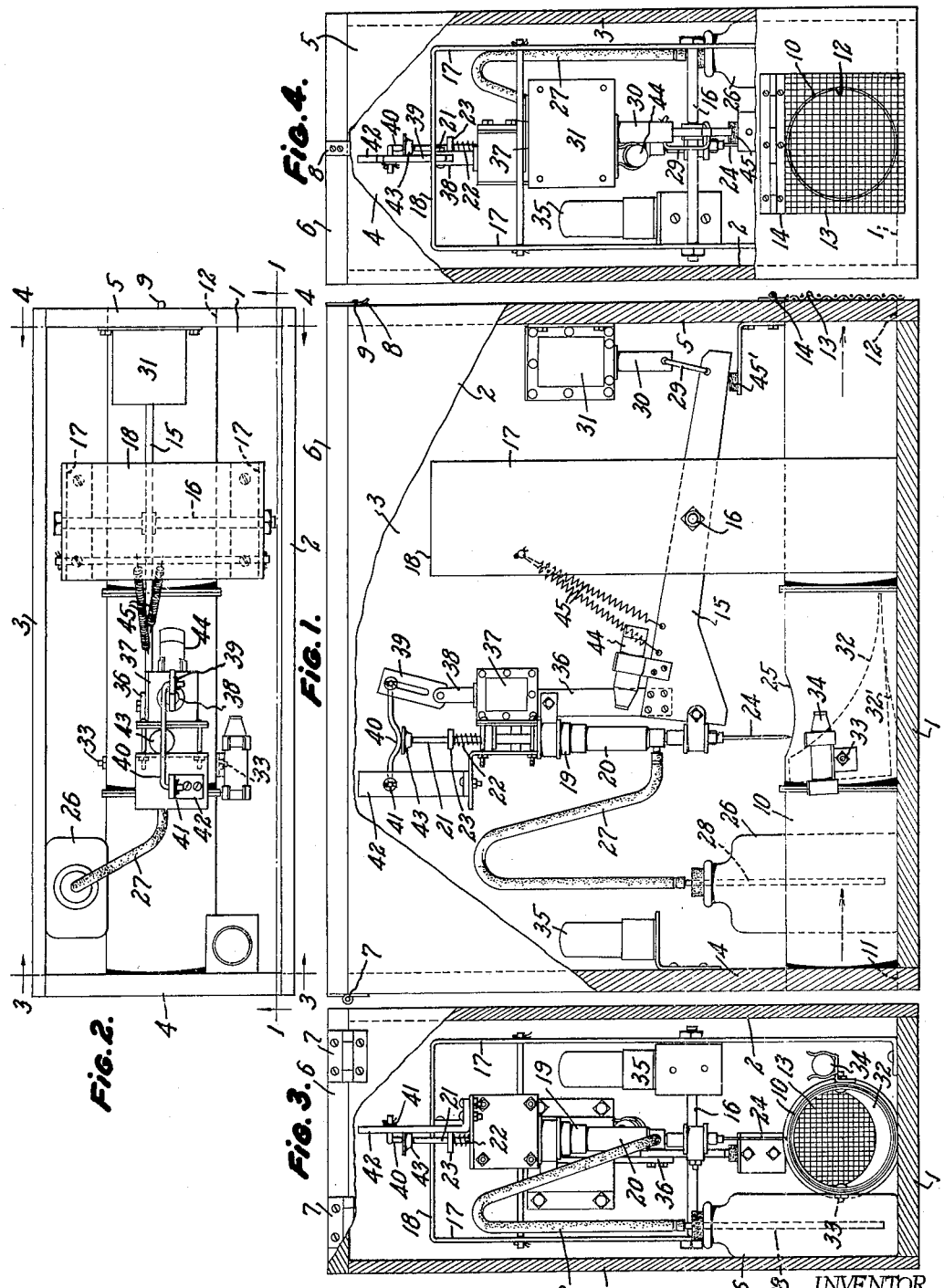

INVENTOR
Forrest C. Wade
BY
ATTORNEY

Patented Nov. 16, 1965

3,217,445
RODENT EXTERMINATOR
Forrest C. Wade, Rte. 4, Cumming, Ga.
Filed Aug. 7, 1964, Ser. No. 388,163
7 Claims. (Cl. 43—131)

This invention relates to rodent exterminators, and it has particular reference to an exterminator for rats, especially wharf rats, and the following description will be directed mainly to such use.

One object of the invention is to provide an exterminator which, as distinguished from a rat trap, will entice a rat to enter it, whereupon mechanism will function to inject into the body of the rat a lethal fluid, for example a poison such as strychnine, having a delayed action sufficient to permit the rat thus carrying the poison to escape from the exterminator and, following normal reaction, to find a secluded, or other, place in which to die. Hence, as distinguished from a rat trap, the device of the invention can function to exterminate any number of rats in succession, inasmuch as after having made an injection of poison into one rat it is automatically immediately reset for operation upon a succeeding rat and, as each rat is permitted to escape after such injection, there is no need for clearing the exterminator of rats.

Consequently, as long as the supply of lethal fluid is maintained, the exterminator is in condition for effective operation and, as will hereinafter appear, means are provided for thus maintaining such a supply and for automatically feeding it to the injecting means.

Another object of the invention is to provide an exterminator which does not have to be baited, as does a trap, thus further making possible its continuance in effective operation without constant attention, the device of the invention being in such form as to excite the inquisitiveness of rats and entice them, upon inspection of it, to enter its confines.

With these and other objects and advantages in view, as will become apparent from the following description, the invention comprises exterminator apparatus including means defining a passageway in the nature of a tunnel having at its opposite ends, respectively, an entrance and an exit for rodents and being preferably of tubular form of such a lateral dimension that once a rodent has entered it he cannot escape by turning back but can only proceed to the exit at the opposite end, hypodermic needle means arranged in proximity to such passageway and mounted for reciprocation with respect thereto so that its needle may be projected into the passageway and into the body of the rodent, trip means of treadle form arranged adjacent to the entrance of the passageway, actuating means for imparting reciprocation to the hypodermic needle means and responsive to depression of the trip means by a rodent stepping upon it, means for actuating the piston of the cylinder of the hypodermic needle means to inject a lethal fluid into the body of the rodent when impaled, means responsive to impaling reciprocation of the hypodermic needle means for activating the piston actuating means, means for deactivating the needle reciprocating means and piston actuating means after injection of the lethal fluid into the body of the rodent, and means for restoring said needle means and piston to initial positions upon deactivation of said reciprocation imparting and piston actuating means to thus condition the apparatus for injecting the lethal fluid into the bodies of successively entering rodents, all as will be explained hereinafter more particularly and finally claimed.

Figure 6:
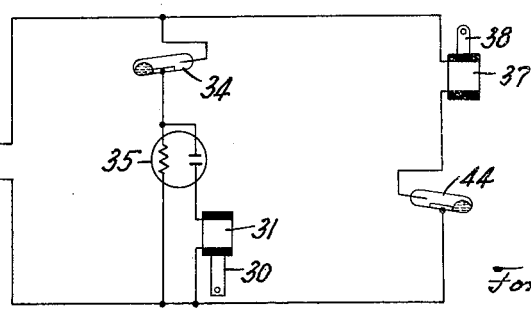

In the accompanying drawings illustrating the invention, in the several figures of which like parts are similarly designated, FIG. 1 is a side view of the apparatus of the invention with a portion of the adjacent side panel of the housing broken away substantially in the plane of line 1—1, FIG. 2, to disclose the housed mechanism which is shown in the "ready" position with the needle of the hypodermic needle means retracted from within the passageway, FIG. 2 is a top view of the apparatus with the cover of the housing removed, FIG. 3 is an end view of the apparatus with a portion of the adjacent end panel of the housing broken away substantially in the plane of line 3—3, FIG. 2, FIG. 4 is a view similar to FIG. 3 but showing the opposite end of the apparatus as viewed in the plane of line 4—4, FIG. 2, FIG. 5 is an enlarged fragmentary side elevation, with parts in section, illustrating, in full and broken lines, the mode of functioning of the apparatus, and FIG. 6 is a wiring diagram for the electrical elements and adjuncts which are included in, and serve to cause functioning of, the apparatus.

As shown in the drawings, the apparatus of the invention includes a housing having a bottom wall 1, side panels 2 and 3, end panels 4 and 5, and a cover 6 hinged at 7 to the end panel 4 and adapted normally to be retained in closed condition by means including a snap catch 8 and cooperating pin or lug 9.

Mounted upon the bottom wall 1, and having its ends extending through the end panels 4 and 5, are means forming a passageway 10 preferably in the form of a tube of a diameter or lateral dimension such that once a rat, or other rodent, has entered it through the entrance opening 11 in its end at the end panel 4 such rodent cannot escape by turning around but must proceed to the exit opening 12 in its end at the end panel 5. Entrance of rodents only through the entrance opening 11 is ensured by providing at the exit opening 12 an outwardly opening barrier in the form preferably, of a screen member 13 hinged at 14 to the end panel 5 so that it may be raised by a rodent leaving the passageway 10 through the exit opening. The screen type of barrier is preferred in order that a rodent entering through the entrance opening 11 may be able to see what appears to be a clear passage, tunnel or hole through which, in his normally inquisitive manner, he will think he can proceed.

Mounted on one end of a lever arm 15 pivoted intermediate its ends on a pivot rod 16 having fixed bearings in the vertical legs 17 of a bridge member 18 secured to the bottom wall 1 and spanning the passageway 10, are the hypodermic needle means of syringe type 19 having a cylinder 20 and a piston or plunger of conventional form (not shown) operated through a rod 21 provided with a return spring 22 bearing at its opposite ends against the adjacent end of the cylinder 20 and against a stop collar 23 affixed to the rod 21.

In its "ready" position the hypodermic needle means extend substantially vertically above the longitudinal axis of the passageway 10 with the hypodermic needle 24 in proximity to an opening 25 in the wall of the passageway but not extending into the passageway.

In order that the syringe of the hypodermic needle means 19 may be supplied with lethal fluid, such as strychnine, for its continued, but intermittent, operation without frequent reservicing, a reservoir 26 of the fluid is mounted within the housing and is connected with the discharge end of the cylinder 20 by a flexible tube 27 having an extension 28 reaching into the reservoir.

operatively connected through a link 29 with the end of the lever arm 15 opposite that carrying the hypodermic needle means 19 are the lever arm operating means in the form, preferably, of the core 30 of an electro-magnet or solenoid 31, and within the passageway 10, near its entrance opening 11, is a trip member or treadle 32 pivoted at 33 in the opposite walls of the passageway and adapted to be depressed, or oscillated upon its pivot, by a rodent stepping upon it. Fixed on the pivot 33, and oscillatable therewith, is a mercury switch 34, or the like switch element, in circuit, through a time delay tube or relay 35 (see FIG. 6) with the solenoid 31. Any appropriate means, such as a leaf spring 32' (FIGS. 1 and 5), may be used for returning the trip means, after depression, to the "ready" position.

Carried at the upper end of an extension member 36 of the lever arm 15, and to which the upper end of the hypodermic needle means are secured, are the means for actuating the piston of the syringe cylinder 20, preferably an electro-magnet or solenoid 37 having its core 38 connected by a lost-motion link 39 with a rocker-link 40 having a fixed pivot 41 in a bracket 42 attached to the housing of the solenoid 37 and bearing against the operating head 43 of the plunger or piston operating rod 21 normally held in following position or contact by the spring 22.

In circuit with the solenoid 37 (see FIGS. 5 and 6) is a mercury switch or the like 44 affixed to the lever arm 15 and tiltable therewith from "on" to "off" position, and vice versa, as the lever arm oscillates, such switch assuming the "on" position when the lever arm is actuated to project the needle 24 into the passageway 10, as shown in broken lines in FIG. 5.

Spring means 45 are provided to restore the lever arm, and with it the needle means 19 and adjuncts carried by it to the "ready" position shown in FIGS. 1 to 4, and in full lines in FIG. 5, a buffer and stop 45' (FIGS. 1, 3, 4 and 5) being provided for limiting this return movement of the lever arm.

Having reference particularly to FIG. 5, it will be understood that, in operation of the device, when a rodent enters the passageway 10 through its entrance opening 11, and depresses, or oscillates, the trip member or treadle 32 and with it the mercury switch 34, the electromagnet of solenoid 31 will be energized to retract its core 30 and oscillate the lever arm 15 thus instantaneously lowering the needle means 19, as shown in broken lines, and causing the needle 24 to pierce, or impale, the body of the rodent. Simultaneously with this piercing by the needle 24, the mercury switch 44 will effect energization of the solenoid 37 to retract its core 38 and thereby oscillate the rocker-link 40 to depress the plunger or piston of the hypodermic cylinder 20 and force a charge of lethal fluid into the body of the rodent.

The delayed action in breaking of the circuits of the solenoids 31 and 37, as timed by the tube or relay 35, is just sufficient for completion of this depression of the plunger or piston of the cylinder 20 and, therefore, immediately thereafter, these two solenoids are deenergized, thus permitting the spring means 45 to restore the lever arm 15, and the needle means 19 and adjuncts carried by it, to the "ready" position, thereby withdrawing the needle 24 from the body of the rodent and permitting the thus-poisoned rodent to escape from the passageway 10 through the exit opening 12 past the barrier screen member 13 which will swing upwardly upon its hinge pivot 14.

It will be apparent that when the solenoid 37 is deenergized, and its core 38 is projected, or is to be projected, the return spring 22 will retract the plunger or piston of the cylinder 20, restore the rocker-link 40 to the position shown in full lines, FIG. 5, and at the same time the plunger or piston will function to recharge the cylinder 20 with lethal fluid from the reservoir 26. Obviously, the connection between the reservoir 26 and the hypodermic cylinder 20 may properly be provided with a check valve (not shown) which will prevent forcing of the charge of fluid from the cylinder back into the reservoir upon action of the plunger or piston to object a charge from the needle 24 and into the body of the rodent.

Various changes and modifications are considered to be within the principle of the invention and the scope of the following claims.

What I claim is:

1. A rodent exterminator, including means defining a passageway having an entrance opening and an exit opening for the passage therethrough of a rodent, hypodermic needle means including the customary cylinder, piston and hypodermic needle, and mounted in cooperative relation to said passageway for reciprocation with respect thereto so that its needle may be projected and retracted relative to the interior of said passageway, the reciprocative mounting of said hypodermic needle means including a lever arm having a fixed pivot intermediate its ends, one end of said lever arm carrying said hypodermic needle means and its other end being connected with actuating means for imparting to it pivotal movement to effect the desired reciprocation of said hypodermic needle means, means for forcing the piston of said hypodermic needle means inwardly of the cylinder thereof and operable when the needle is projected into the interior of said passageway, trip means arranged in said passageway, connections between said trip means and the actuating means of said lever arm and operable in the presence of a rodent on said trip means to trigger the actuating means of said lever arm and thereby cause the needle to be inserted into the body of the rodent, whereupon the actuating means of said piston will be activated to force a charge of lethal fluid from said cylinder into the body of the rodent, means for thereafter restoring said lever arm with the hypodermic needle means to its initial position to thus free the poisoned rodent for exit through the exit opening the passageway, and means for restoring said piston to its initial position with relation to said cylinder.

2. A rodent exterminator as defined in claim 1, in which means are provided for supplying charges of lethal fluid to said cylinder, the restoring of said piston to its initial position serving to draw fluid from said supply and into said cylinder to recharge the same.

3. A rodent exterminator as defined in claim 1, in which the actuating means for said lever arm and piston, respectively, include electro-magnets, and the electric circuits of said electro-magnets include switch means closed, respectively, by said trip means when actuated by the presence of a rodent thereon, and by resulting pivotal movement of said lever arm.

4. A rodent exterminator as defined in claim 3, in which the switch means include switch elements mounted for movement with said trip means and lever arm, respectively, and responsive to movement of said trip means and lever arm, respectively, to effect their opening and closing.

5. A rodent exterminator as defined in claim 4, in which said switch elements are responsive to angular positions of said trip means and lever arm, respectively.

6. A rodent exterminator as defined in claim 5, in which said switch elements are mercury switches.

7. A rodent exterminator as defined in claim 3, in which means are provided in the circuits of the electro-magnets of said lever arm actuating means and said piston actuating means for effecting deenergization of said electro-magnets after said piston has completed its fluid-forcing movement within the cylinder, to thus permit restoration of the lever arm and piston to their initial positions by said restoring means.

No references cited.

SAMUEL KOREN, *Primary Examiner.*